United States Patent [19]
Goellner et al.

[11] Patent Number: 6,152,268
[45] Date of Patent: Nov. 28, 2000

[54] ROD CLAMP APPARATUS

[75] Inventors: Willy J. Goellner; Miodrag. M. Mihajlovic, both of Rockford, Ill.

[73] Assignee: Advanced Machine & Engineering Co., Rockford, Ill.

[21] Appl. No.: 09/216,771

[22] Filed: Dec. 21, 1998

[51] Int. Cl.[7] .................................................. B65H 59/10
[52] U.S. Cl. ................................ 188/67; 188/170; 91/41; 92/28
[58] Field of Search ......................... 188/67, 82.8, 82.84, 188/166, 167, 168, 170; 91/41; 92/15, 23, 24, 27, 28, 29

[56] References Cited

U.S. PATENT DOCUMENTS

| | | |
|---|---|---|
| 4,577,732 | 3/1986 | Gottling . |
| 5,115,889 | 5/1992 | Fortmann et al. . |
| 5,540,135 | 7/1996 | Goellner . |
| 5,791,230 | 8/1998 | Goellner .................................. 92/24 X |

FOREIGN PATENT DOCUMENTS

3615985 A1  11/1981  Germany .

*Primary Examiner*—Michael Mar
*Assistant Examiner*—Pamela J. Lipka
*Attorney, Agent, or Firm*—Vernon J. Pillote

[57] ABSTRACT

A rod clamp device having a rod clamp sleeve with a frusto-conical outer surface and an annular cam with a frusto-conical inner surface and an annular ball guide cage arranged to equalize movement of the bearing balls in circumferentially spaced paths along the clamp sleeve so that the annular cam applies pressure through the bearing balls uniformly around the rod clamp sleeve when the cam is moved axially in one direction to a rod clamp position, and the annular cam uniformly releases pressure on the bearing balls when the cam is moved axially in an opposite direction to a release position. The rod clamp sleeve has slots and the ball guide cage is keyed to the clamp sleeve to maintain a preset angular relation therebetween while allowing relative axial movement.

14 Claims, 2 Drawing Sheets

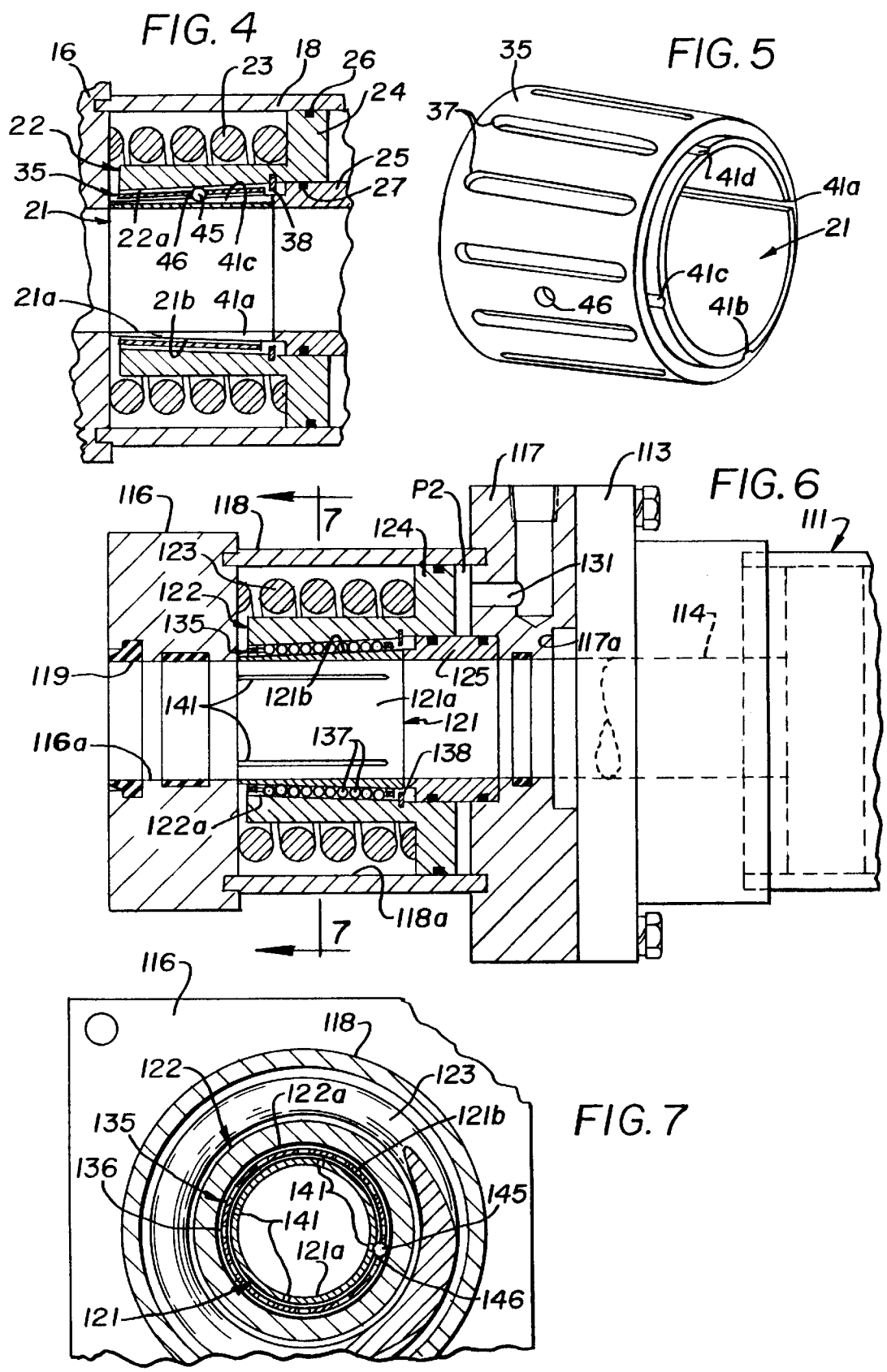

ROD CLAMP APPARATUS

BACKGROUND OF THE INVENTION

The present invention relates to a rod clamp apparatus of the type having an annular rod clamp ring and an annular cam movable axially in one direction relative to the clamp ring to a clamp position, and in an opposite direction to a clamp release position. Some rod clamps have used antifriction bearings arranged for rolling engagement between the annular cam and rod clamp ring to reduce frictional resistance to axial movement of the cam between the rod clamp and rod release positions. The antifriction bearings roll lengthwise of the cam during axial movement of the cam and grooves or recesses have heretofore been provided in the clamp ring for guiding the antifriction bearings along circumferentially spaced paths. However, if the antifriction bearings in one or more of the grooves become displaced in a longitudinal direction relative to the antifriction bearings in other circumferentially spaced grooves, the radial forces applied by the annular cam through the antifriction bearings to the clamp ring will not be uniformly distributed around the piston rod and may cause erratic clamping or release of the rod.

SUMMARY OF THE INVENTION

It is an object of the present invention to provide a rod clamp device using bearing balls between an annular clamp ring and an annular cam, and which guides movement of the bearing balls along circumferentially spaced paths lengthwise of the clamp ring and also controls movement of the bearing balls longitudinally of the clamp ring so that the annular cam applies clamping pressure uniformly around the rod clamp when the cam is moved to a rod clamp position, and the annular cam uniformly releases the rod clamping pressure around the rod clamp when the annular cam is moved to a release position.

Another object of the present invention is to provide a rod clamp device in accordance with the foregoing object, which is spring actuated to a rod clamp position and fluid pressure operated to a clamp release position, and which can provide reliable release of the rod clamp ring at low plant operating pressures.

A further object of this invention is to provide rod clamp device using bearing balls between an annular clamp ring and an annular cam, which can be economically manufactured.

The present invention accomplishes the above objects, among others, by providing a rod clamp device having an annular rod clamp sleeve with a frusto-conical external surface and annular cam extending around the rod clamp sleeve having a frusto-conical inner surface radially spaced from the rod clamp sleeve, and an annular ball guide cage intermediate the frusto-conical external surface on the rod clamp sleeve and the frusto-conical inner surface on the annular cam. The annular ball guide cage has a plurality of circumferentially spaced ball receiving openings and bearing balls disposed in the ball receiving openings in rolling engagement with the conical inner cam surface on the annular cam and the frusto-conical external surface on the rod clamp sleeve. The ball receiving openings in the ball guide cage are configured to guide the bearing balls in the ball receiving openings for rolling along paths lengthwise of the rod clamp sleeve and to cause the ball guide cage to move axially with the bearing balls when the annular cam is moved in one axial direction to a rod clamp position. An abutment is provided on the annular cam and configured to engage the ball guide cage and move the ball guide cage and the bearing balls therein axially of the rod clamp sleeve to a reset position when the annular cam is moved in an opposite axial direction to a clamp release position.

The rod clamp sleeve is advantageously provided with circumferentially spaced slots extending lengthwise of the rod clamp sleeve to facilitate radial contraction and expansion, and key means engaging the ball guide cage and the rod clamp sleeve to maintain a preset angular relation between the rod clamp sleeve and the ball guide cage while allowing relative axial movement therebetween, to guide the bearing balls in the cage along lengthwise paths intermediate the slots in the rod clamp sleeve.

BRIEF DESCRIPTION OF THE DRAWINGS

FIG. 4 is a fragmentary sectional view taken on the plane 4—4 of FIG. 2;

FIG. 5 is a perspective view of a subassembly of the rod clamp sleeve and ball guide cage, with the bearing balls omitted;

FIG. 6 is a fragmentary longitudinal view through a second embodiment of the rod clamp device applied to a linear fluid actuator; and FIG. 7 is a transverse sectional view taken on the plane 7—7 of FIG. 6.

DETAILED DESCRIPTION

Figure 1:
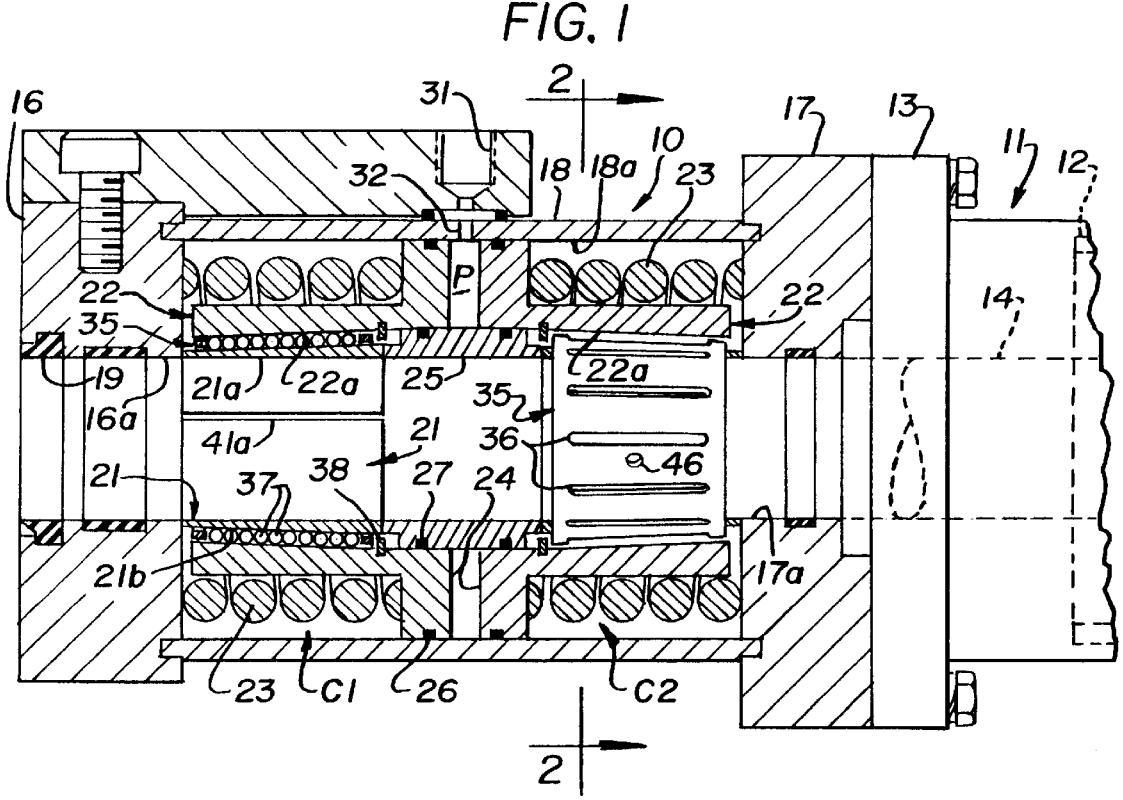
FIG. 1 is a longitudinal sectional view of one embodiment of the rod clamp device applied to a linear fluid actuator, and with parts shown in elevation, and showing the annular cam in a rod clamp position.

The present invention relates to a rod clamp apparatus 10 which is operable between a rod clamp condition and a rod release condition. The rod clamp is shown in FIG. 1 applied to a linear fluid actuator 11 having an actuator cylinder 12, a cylinder head 13 and a piston rod 14 extending through the cylinder head. The rod clamp apparatus 10 is spring actuated to a rod clamp condition and fluid pressure actuated to a rod release condition.

The rod clamp apparatus includes a housing having first and second end walls 16 and 17, and an outer casing 18 extending between the end walls. The end wall 17 is shown in FIG. 1 attached to the cylinder head, but may be formed integrally with the cylinder head, as is common in the art. The end walls of the rod clamp have openings 16a and 17a to allow passage of the piston rod 14 through the housing, and a resilient wiper ring 19 is provided on the end wall 16 to inhibit entrance of foreign matter into the rod clamp device during retraction of the piston rod.

In the embodiment of FIGS. 1–5, the rod clamp apparatus includes two rod clamp devices designated C1 and C2 disposed in the housing 10. The rod clamp devices C1 and C2 are of like construction and like numerals are used to designate the same parts. Each rod clamp device includes a rod clamp sleeve 21 retained against axial movement in the housing coaxial with the cylinder wall axis, an annular cam 22 extending around the rod clamp sleeve and radially spaced therefrom, and a piston 24 fixed to the annular cam. Spring means 23 biases the annular cam in one axial direction and the annular piston 24 is slidable between the inner cylinder wall 18a of casing 18 and the outer wall of a collar 25. The rod clamp devices C1 and C2 are conveniently arranged so that they are spring actuated in a direction toward the center of the housing to a clamp condition and fluid pressure actuated in the opposite direction toward the respective end walls to a release condition in response to fluid pressure in a chamber P provided in the housing between the piston end faces. As best shown in FIG. 1, an O-ring 26 in the piston provides a sliding seal with the outer casing and an O-ring 27 in the collar 25 provides a sliding seal with the piston, and fluid pressure is supplied to the chamber P through a fitting 31 and a passage 32 in the casing 18.

Each rod clamp sleeve 21 has one end engaging an end wall and an opposite end engaging the collar 25 and is retained thereby against axial movement in the housing. Each rod clamp sleeve has a cylindrical inner surface 21a for engaging the rod 14 and a frusto-conical external surface 21b that expands or diverges outwardly at a preset cone-angle in one direction, herein shown in a direction toward the pressure chamber P intermediate the ends of the housing. The annular cam 22 has a frusto-conical inner cam surface 22a that expands outwardly at the same preset cone-angle in a direction toward the pressure chamber. The cone-angle between diametrically opposite surfaces of the frusto-conical inner cam surface, is preferably low, for example of the order of 2 to 3 degrees, to reduce the axial forces required to move the annular cam 22 into and out of a rod clamp position without excessive cam travel.

An annular ball guide cage 35 is disposed intermediate the frusto-conical external cam surface 21b of rod clamp sleeve and the frusto-conical inner cam surface 22a of the annular cam 22 and is movable longitudinally relative thereto. The annular ball guide cage has a plurality of circumferentially spaced ball receiving openings 36 and bearing balls 37 disposed in the ball receiving openings in rolling engagement with the frusto-conical inner cam surface 22a of the annular cam 22 and the frusto-conical external cam surface 21b of the rod clamp sleeve. The ball guide cage may conveniently be formed of a synthetic resinous plastic material having good dimensional stability, for example acetal resins, and preferably has a radial thickness about one-half the diameter of the bearing balls. The ball receiving openings 36 are preferably located at uniformly angular spaced locations around the rod clamp sleeve and, in the embodiment illustrated, twelve ball receiving openings are provided and angularly spaced apart about 30 degrees. The ball receiving openings are preferably elongated in a direction lengthwise of the cage and have closed ends to receive a plurality of balls in a row. Alternatively, it is contemplated that the cage could be formed with a plurality of circumferentially spaced and longitudinally spaced ball receiving openings, each arranged to receive one or more bearing balls.

Figure 3:
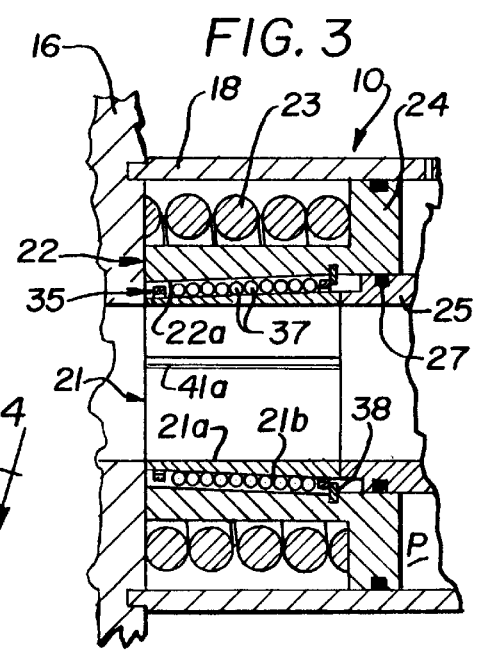
FIG. 3 is a fragmentary longitudinal sectional view taken on the same plane as FIG. 1 and showing the annular cam in a clamp release position.

When the annular cam 22 is moved from a clamp release position as shown in FIG. 3, to a rod clamp position as shown in FIG. 1, the radial spacing between the frusto-conical inner cam surface 22a and the frusto-conical external cam surface 21b progressively decreases. The bearing balls between the annular cam and the annular rod clamp sleeve roll lengthwise of the rod clamp sleeve a distance about one-half the movement of the annular cam and the clamping pressure transmitted through the balls to the rod clamp sleeve progressively increases. The width of the ball receiving openings is slightly greater than the diameter of the balls to allow the balls to roll while guiding the balls for movement along circumferentially spaced paths longitudinally of the ball guide cage. The balls substantially fill the ball receiving openings and the balls are constrained by the ends of the ball receiving openings so that the ball guide cage moves longitudinally of the rod clamp sleeve with the bearing balls, when the annular cam is moved from the release position shown in FIG. 3 to the clamp position shown in FIG. 1. An abutment 38, herein shown in the form of a snap-ring disposed in a groove in the annular cam member, is movable with the annular cam and is configured to engage the ball guide cage and move the ball guide cage and all of the bearing balls therein, when the annular cam member is moved axially from the rod clamp position shown in FIG. 1 to the clamp release position shown in FIG. 3, to assure movement of the bearing balls in all of the ball receiving openings to the same reset position. When the pressure in the chamber P is released, the spring 23 urges the annular cam 22 toward the rod clamp position shown in FIG. 1, and the abutment 38 moves out of engagement with the ball guide cage and allows movement of the ball guide cage by the bearing balls to a rod clamp position. This arrangement effectively assures that the balls in all of the ball receiving openings move to substantially the same longitudinal position on the rod clamp sleeve when the annular cam is moved to a rod clamp position, and that the bearing balls in all of the ball receiving openings are moved to substantially the same reset position, when the annular cam is moved to a clamp release position.

Figure 2:
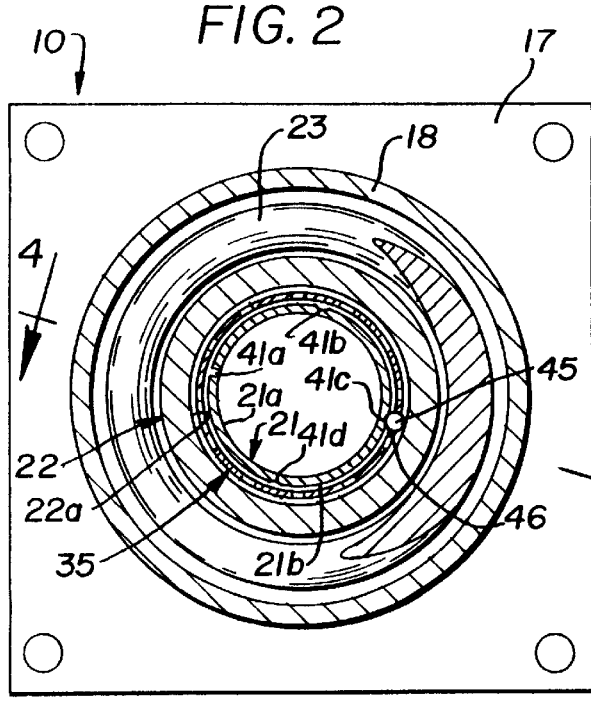
FIG. 2 is a transverse sectional view taken on the plane 2—2 of FIG. 1.

In this embodiment, each rod clamp sleeve 21 is formed with a plurality of circumferentially spaced slots 41, herein shown four in number and designated 41a, 41b, 41c, and 41d, (see FIGS. 3 and 5) extending lengthwise of the clamp sleeve, to facilitate radial movement of the clamp sleeve into and out of a clamping condition. Each rod clamp device is provided with a key means 45 for maintaining a preset angular relation between the ball guide cage and the rod clamp sleeve while allowing relative axial movement therebetween. The key means is configured to retain the ball guide cage in an angular position relative to the rod clamp sleeve such that the ball receiving openings in the ball guide cage are angularly intermediate slots in the rod clamp sleeve, as best shown in FIG. 2. The key means 45 conveniently comprises one or more key balls that are preferably slightly larger in diameter than the bearing balls 37 and disposed in an opening 46 located intermediate two adjacent ball receiving slots 37 in the ball guide cage, as best shown in FIGS. 4 and 5. The key ball 45 is positioned during assembly to extend into one of the slots 41 in the rod clamp sleeve. With this arrangement, the ball receiving openings 36 are disposed circumferentially intermediate the slots in the rod clamp sleeve 21 so that the bearing balls engage the frusto-conical outer surface 21b of the rod clamp sleeve 21 intermediate the slots in the sleeve. Preferably the rod clamp sleeve is formed with a number x of the slots at uniformly spaced locations and the cage formed with a number y of the ball receiving openings at uniformly spaced locations, with y being a multiple of x. In the embodiment shown, the rod clamp sleeve is formed with four slots and the ball guide cage is formed with twelve ball receiving openings, so that three rows of balls engage the rod clamp sleeve intermediate adjacent ones of the slots.

As previously discussed, the slots 41a–41d in the rod clamp sleeve are provided to facilitate radial contraction of the sleeve during clamping of the rod. In the embodiment of FIGS. 1–5, one of the slots 41a comprises a slit extending from end-to-end of the rod clamp sleeve, and other of the slots 41b, 41c and 41d comprise grooves in the outer surface of the rod clamp sleeve 21, the grooves being configured to progressively increase in depth in the direction of outward taper of the frustoconical external surface 21b of the rod clamp sleeve so that the bottom of each of the grooves 41b, 41c and 41d is spaced a generally uniform distance from the cylindrical inner surface of the rod clamp sleeve as best shown in FIG. 4.

A second embodiment of the rod clamp is illustrated in FIGS. 6 and 7. The rod clamp of FIGS. 6 and 7 is similar to that of FIGS. 1–5 and like numerals in the 100 series are used to designate corresponding parts. The rod clamp device 110 is herein shown applied to a linear fluid actuator 111, it being understood that the rod clamp is generally adapted for selectively clamping a rod or shaft against axial movement. As is conventional, a linear actuator includes an actuator cylinder 112 having cylinder head 113 and a piston rod 114 extending through the cylinder head. The rod clamp device 110 includes a housing having first and second end walls 116 and 117 and an outer casing 118 extending between the end walls and providing an inner cylinder wall 118a. The end wall 117 is shown attached to the cylinder head 113, and may be formed integrally with the cylinder head as is common in the art. The end walls of the rod clamp have openings 116a and 117a to allow passage of the piston rod 114 therethrough, and resilient wiper ring 119 is provided on the end wall 116 to inhibit entrance of foreign matter into the rod clamp.

In the embodiment of FIGS. 6 and 7, the rod clamp has a single rod clamp device comprising an annular clamp sleeve 121 and an annular cam 122 extending around the clamp sleeve, and an annular piston 124 is fixed to the annular cam and slidable between the inner cylinder wall 118a of the housing and a collar 125. Clamp sleeve 121 is positioned between the end wall 116 and the collar 125 and is retained thereby against axial movement in the housing. Rod clamp sleeve 121 has a cylindrical inner wall 121a and a frusto-conical external cam surface 121b, and the annular cam 122 has a frusto-conical inner cam surface 122a. Cam surfaces 121b and 122a taper outwardly at a preset cone angle in a direction toward a pressure chamber P2 in the housing located between the end wall 117 and an end face of the piston 124, and the cone angle between diametrically opposite surfaces of the frusto-conical inner cam surface of the annular cam is preferably low and the order of two or three degrees.

An annular ball guide cage 135 is disposed intermediate the external cam surface 121b on the rod clamp sleeve and the frusto-conical cam inner surface 122a on the rod clamp and is movable longitudinally relative thereto. The annular ball guide cage has a plurality of circumferentially spaced ball receiving openings 136, and rows of bearing balls 137 substantially filling the ball receiving openings.

The rod clamp sleeve 121 has a plurality of slots 141 extending lengthwise of the sleeve to facilitate radial contraction and expansion and, in this embodiment, the clamp sleeve has four slots 141 in the form of slits in one end portion of the ball guide cage. The number of circumferentially spaced ball receiving openings in the cage is preferable a multiple of the number of slots 141 and, as shown in FIG. 7, the cage has twelve slots. Key means 145 is provided for maintaining a preset angular relation between the ball guide cage and rod clamp sleeve while allowing relative axial movement therebetween, so that the ball receiving openings 136 and the balls 137 therein are disposed angularly intermediate the slots 141 in the rod clamp sleeve as shown in FIG. 7. As in the preceding embodiment, the key means 145 preferably comprises one or more key balls disposed in an opening 146 in the cage, which opening is located circumferentially intermediate adjacent ones of the ball receiving openings 136. The ball guide cage is positioned during assembly so that the key ball 145 engages one of the slots 141 in the cage, as shown in FIG. 7.

The ball receiving openings 136 in the ball guide cage are conveniently configured in the same manner as previously described in connection with the embodiment of FIGS. 1–5, to guide the bearing balls along rectilinear paths during movement of the annular cam relative to the rod clamp sleeve, and to also control movement of the balls in a direction lengthwise of the rod clamp sleeve.

In this embodiment, fluid pressure is supplied to the pressure chamber P2 through a passage 131 in the end wall 117. When fluid pressure is supplied to the chamber P2, the piston 124 moves the annular cam 121 to the left as viewed in FIG. 6 and a shoulder 138, conveniently in the form of a split-ring mounted in a groove in the annular cam, is configured to engage the end of the ball guide cage and move the ball guide cage and all of the balls therein to the same reset position. When fluid pressure in the chamber P2 is released, the spring 123 moves the annular cam in a direction toward the pressure chamber P2, to the right as viewed in FIG. 6, and the shoulder 138 moves away from the end of the ball guide cage. The bearing balls are guided in the slots in the ball cage longitudinally of the rod clamp sleeve as the annular cam is moved longitudinally between the clamp release and the rod clamp position. The slots in the cage are configured to control endwise movement of the balls in the slots so that the balls in all of the ball receiving openings move to substantially the same position axially of the rod clamp sleeve, when the cam is moved to its rod clamp position and, conversely, the balls in all of the ball receiving openings are moved to substantially the same reset position when the annular cam is moved to its clamp release position. With this arrangement, the annular cam 122 applies pressure to actuate the rod clamp to its clamp position substantially uniformly around the rod clamp when the cam is moved to its clamp position and conversely, the rod clamp uniformly releases pressure on the balls, when the annular cam is moved to its clamp release position.

While the preferred embodiments of the invention have been illustrated and described herein, it is to be understood that the invention is not limited thereto but may be otherwise embodied and practiced within the scope of the following claims.

The embodiments of the invention in which an exclusive property or privilege is claimed are defined as follows:

1. A rod clamp comprising a housing having a cylinder wall and end walls and openings in the end walls aligned along a cylinder wall axis for slidably receiving a rod, at least one rod clamp device in the housing, said at least one rod clamp device including:

a. a rod clamp sleeve retained against axial movement in the housing coaxial with the cylinder wall axis, the rod clamp sleeve having a cylindrical inner surface and a frusto-conical external surface that tapers outwardly at a preset cone angle in a first axial direction;

b. an annular cam extending around the rod clamp sleeve and radially spaced therefrom, the cam having a frusto-conical internal cam surface that tapers outwardly at said preset cone angle in said first axial direction, an annular piston fixed to the annular cam and slidable in the housing and having an end face;

c. at least one spring biasing the annular cam in said first axial direction for actuating the rod clamp sleeve to a rod clamp condition;

d. the housing providing a fluid pressure chamber at the piston end face and a passage for supplying fluid pressure to the chamber for moving the piston and annular cam in a second axial direction opposite said first axial direction to a clamp release position;

e. an annular ball guide cage intermediate the frusto-conical external surface on the rod clamp sleeve and the frusto-conical cam inner surface on the annular cam and movable axially relative thereto, the annular ball guide cage having a plurality of circumferentially spaced ball receiving openings and bearing balls disposed in the ball receiving openings in rolling engagement with the frusto-conical inner cam surface on the annular cam and the frusto-conical external surface on the rod clamp sleeve, the ball receiving openings in the ball guide cage being configured to allow rotation of the bearing balls in the ball receiving openings and cause the ball guide cage to move with the bearing balls when the annular cam is moved in said first axial direction;

f. an abutment movable with the annular cam, the abutment being configured to engage the ball guide cage and move the ball guide cage and the bearing balls therein in said second axial direction to a preset position when the annular cam is moved in said second axial direction, the abutment moving out of engagement with the ball guide cage when the annular cam is moved in said first axial direction to allow movement of the ball guide cage by the bearing balls in the first axial direction.

2. The combination of claim 1 wherein said at least one rod clamp device includes key means engaging the ball guide cage and the rod clamp sleeve for maintaining a preset angular relation therebetween while allowing relative axial movement.

3. The combination of claim 1 wherein said rod clamp sleeve has a plurality of circumferentially spaced slots extending lengthwise of the rod clamp sleeve, said at least one rod clamp device including key means engaging the ball guide cage and the rod clamp sleeve for maintaining a preset angular relation therebetween while allowing relative axial movement, at least some of the ball receiving openings in the ball guide cage being angularly intermediate the slots in the associated clamp sleeve when the ball guide cage is in said preset angular relation with the rod clamp sleeve.

4. The combination of claim 1 wherein said rod clamp sleeve has a plurality of circumferentially spaced slots extending lengthwise of the rod clamp sleeve, one of the slots comprising a slit extending from end-to-end of the rod clamp sleeve, other ones of the circumferentially spaced slots comprising grooves in the frusto-conical external surface of the rod clamp sleeve, the grooves progressively increasing in depth in said first axial direction such that a bottom of each groove is spaced a generally uniform distance from the cylindrical inner surface of the rod clamp sleeve.

5. The combination of claim 1 wherein said rod clamp sleeve has a plurality of circumferentially spaced slots extending lengthwise of the rod clamp sleeve, the slots each comprising a slit in one end of the end of the rod clamp sleeve.

6. The combination of claim 1 wherein said ball guide cage has a number x of the ball receiving openings at locations uniformly spaced apart, said rod clamp sleeve having a number y of circumferentially spaced slots, where x is a multiple of y, said ball guide cage having a key receiving opening intermediate two adjacent ones of the ball receiving openings, key means in the key receiving opening extending into one of the slots in the clamp sleeve for maintaining a preset angular relation between the ball guide cage and rod clamp sleeve while allowing relative axial movement therebetween.

7. The combination of claim 6 wherein said key means comprises at least one ball.

8. A rod clamp comprising a housing having a cylinder wall and end walls and openings in the end walls aligned along a cylinder wall axis for slidably receiving a rod, at least one rod clamp device in the housing, said at least one rod clamp device including:

a. a unitary rod clamp sleeve retained against axial movement in the housing coaxial with the cylinder wall axis, the rod clamp sleeve having a cylindrical inner surface and a frusto-conical external surface that tapers outwardly at a preset cone angle in a first axial direction, the rod clamp sleeve having a plurality of circumferentially spaced slots extending lengthwise of the rod clamp sleeve;

b. an annular cam extending around the rod clamp sleeve and radially spaced therefrom, the cam having a frusto-conical internal cam surface tapered outwardly at said preset cone angle in said first axial direction, an annular piston fixed to the annular cam and slidable in the housing and having an end face;

c. at least one spring biasing the annular cam in said first axial direction for actuating the rod clamp sleeve to a rod clamp condition;

d. the housing providing a fluid pressure chamber at said piston end face and a passage for supplying fluid pressure to the chamber for moving the piston and annular cam in a second axial direction opposite said first axial direction to a clamp release position;

e. an annular ball guide cage intermediate the frusto-conical external surface on the rod clamp sleeve and the frusto-conical inner cam surface on the annular cam and movable axially relative thereto, the annular ball guide cage having a plurality of circumferentially spaced ball receiving openings elongated in a direction longitudinally of the ball guide cage and rows of bearing balls in the ball receiving openings in rolling engagement with the frusto-conical inner cam surface on the annular cam and the frusto-conical external surface on the rod clamp sleeve, the ball receiving openings in the ball guide cage having closed ends and being configured to allow rotation of the row of bearing balls in the elongated ball receiving openings and cause the ball guide cage to move with the bearing balls when the annular cam is moved in said first axial direction, key means engaging the ball guide cage and the rod clamp sleeve for maintaining a preset angular relation therebetween while allowing relative axial movement, at least some of the ball receiving openings in the ball guide cage being angularly intermediate the slots in the rod clamp sleeve when the ball guide cage is in said preset angular relation with the rod clamp sleeve;

f. an abutment movable with the annular cam, the abutment being configured to engage the ball guide cage and move the ball guide cage and the rows of balls therein in said second axial direction to preset position when the annular cam is moved in said second direction to the clamp release position, the abutment moving out of engagement with the annular cage when the annular cam is moved in said first axial direction.

9. The combination of claim 8 wherein one of the circumferentially spaced slots in the rod clamp sleeve comprises a slit extending from end-to-end of the rod clamp sleeve, other ones of the circumferentially spaced slots comprising grooves in the frusto-conical external surface of the rod clamp sleeve, the grooves progressively increasing in depth in said first axial direction such that a bottom of each groove is spaced a generally uniform distance from the cylindrical inner surface of the rod clamp sleeve.

10. The combination of claim 8 wherein said rod clamp sleeve's plurality of circumferentially spaced slots extend lengthwise of the rod clamp sleeve, the slots comprising slits in one end of the rod clamp sleeve.

11. The combination of claim 8 wherein said ball guide cage has a number x of the ball receiving openings at locations uniformly spaced apart, said rod clamp sleeve having a number y of the circumferentially spaced slots, where x is a multiple of y, each ball guide cage having a key receiving opening intermediate two adjacent ones of ball receiving openings, key means in the key receiving opening extending into one of the slots in the clamp sleeve for maintaining a preset angular relation between the ball guide cage and rod clamp sleeve while allowing relative axial movement therebetween.

12. The combination of claim 11 wherein said key means comprised at least one ball.

13. The combination of claim 11 wherein the rod clamp has two rod clamp devices in the housing.

14. The combination of claim 11 wherein the rod clamp has only one rod clamp device in the housing.

* * * * *